(12) United States Patent
Autenrieth

(10) Patent No.: US 11,278,001 B2
(45) Date of Patent: Mar. 22, 2022

(54) MODULAR PET BED

(71) Applicant: Kristen M. Autenrieth, San Diego, CA (US)

(72) Inventor: Kristen M. Autenrieth, San Diego, CA (US)

(*) Notice: Subject to any disclaimer, the term of this patent is extended or adjusted under 35 U.S.C. 154(b) by 0 days.

(21) Appl. No.: 16/886,581

(22) Filed: May 28, 2020

(65) Prior Publication Data

US 2020/0375144 A1    Dec. 3, 2020

Related U.S. Application Data

(60) Provisional application No. 62/854,872, filed on May 30, 2019.

(51) Int. Cl.
*A01K 1/035* (2006.01)
*A01K 1/00* (2006.01)

(52) U.S. Cl.
CPC .......... *A01K 1/0353* (2013.01); *A01K 1/0076* (2013.01); *A01K 1/0082* (2013.01)

(58) Field of Classification Search
CPC ....... A47C 7/021; A47C 27/001; A47C 17/04; A47C 13/005; A01K 1/0353
See application file for complete search history.

(56) References Cited

U.S. PATENT DOCUMENTS

| | | | | |
|---|---|---|---|---|
| 5,136,981 A | * | 8/1992 | Barreto, III | A01K 1/0353 119/28.5 |
| 5,765,502 A | * | 6/1998 | Haugh | A01K 1/0353 119/28.5 |
| 2004/0134433 A1 | * | 7/2004 | Holder | A01K 1/0353 119/28.5 |
| 2006/0272582 A1 | * | 12/2006 | Dunn | A01K 1/0353 119/28.5 |
| 2019/0166794 A1 | * | 6/2019 | Dickey | A47G 9/0223 |
| 2020/0315131 A1 | * | 10/2020 | Bullock | A01K 1/0353 119/28.5 |

FOREIGN PATENT DOCUMENTS

KR    102136044 B1 *  7/2020

* cited by examiner

*Primary Examiner* — Timothy D Collins
*Assistant Examiner* — Brittany A Lowery
(74) *Attorney, Agent, or Firm* — Procopio, Corey, Hargreaves & Savitch, LLP

(57) ABSTRACT

Modular pet beds that can be disassembled into multiple smaller parts are provided. The individual parts can maintain their shape and can be fastened back together once they are clean and dry. Contemplated pet beds can comprise two or more pet bed components, and a set of fastener assemblies operable to couple the pet bed component together. Some pet bed components can comprise a single segment, or can comprise multiple segments that are permanently and/or removably coupled to one another.

18 Claims, 15 Drawing Sheets

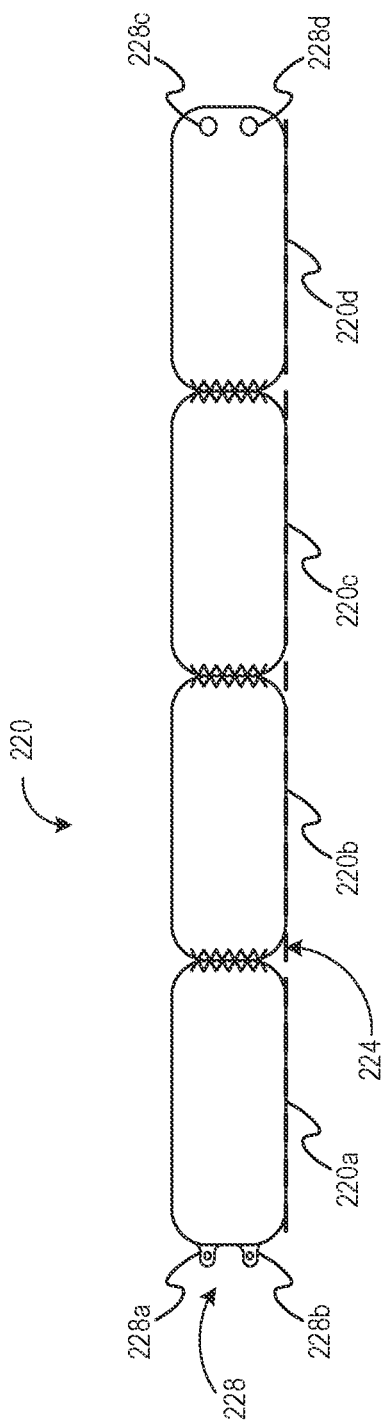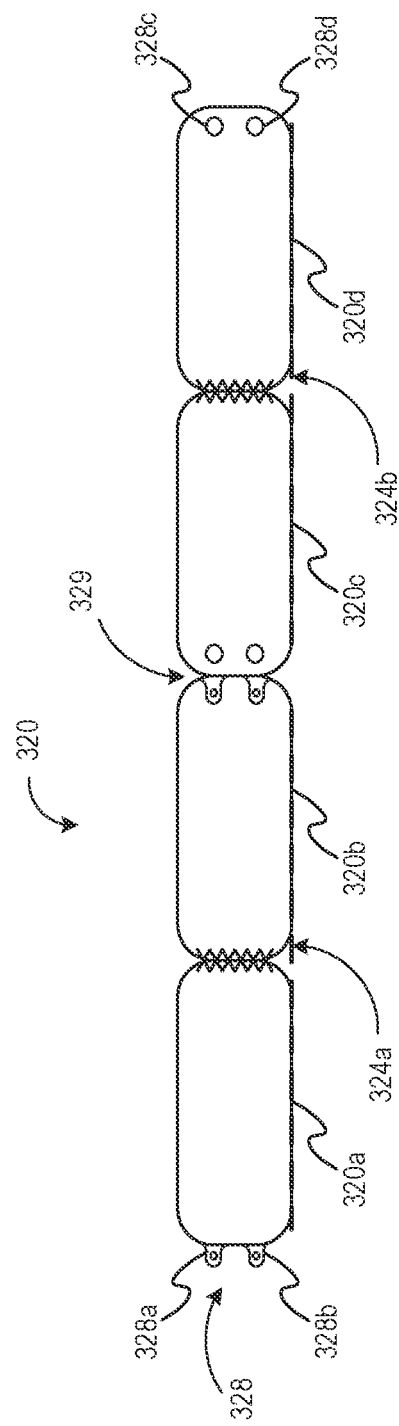
FIG. 2
FIG. 3

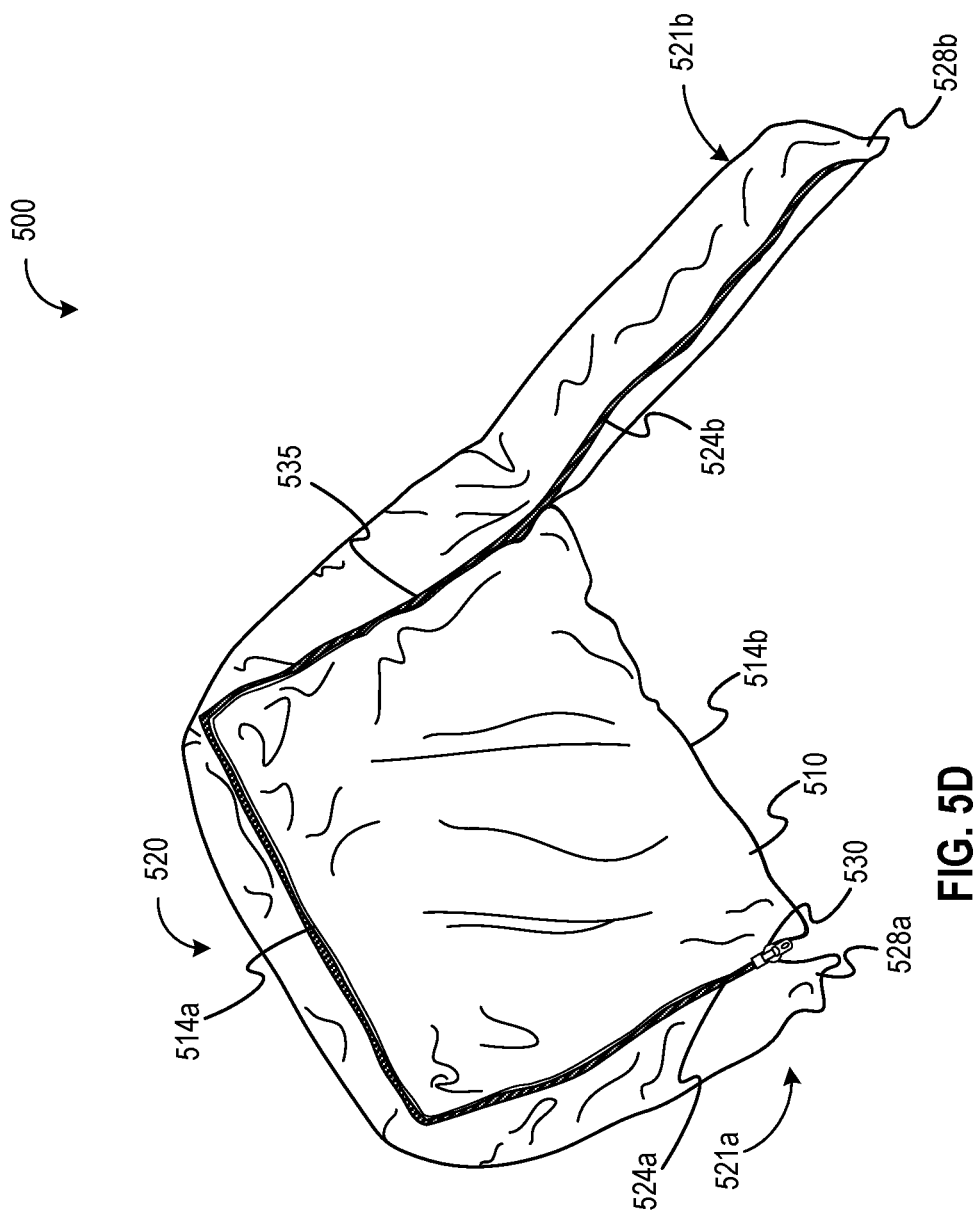

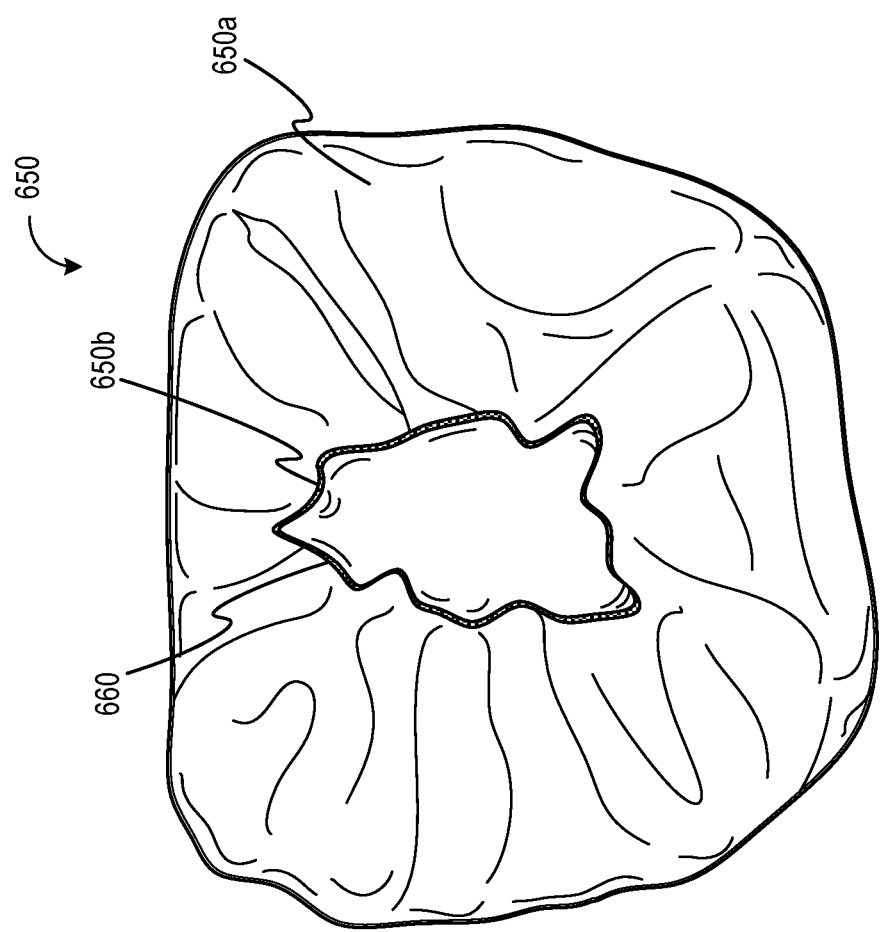

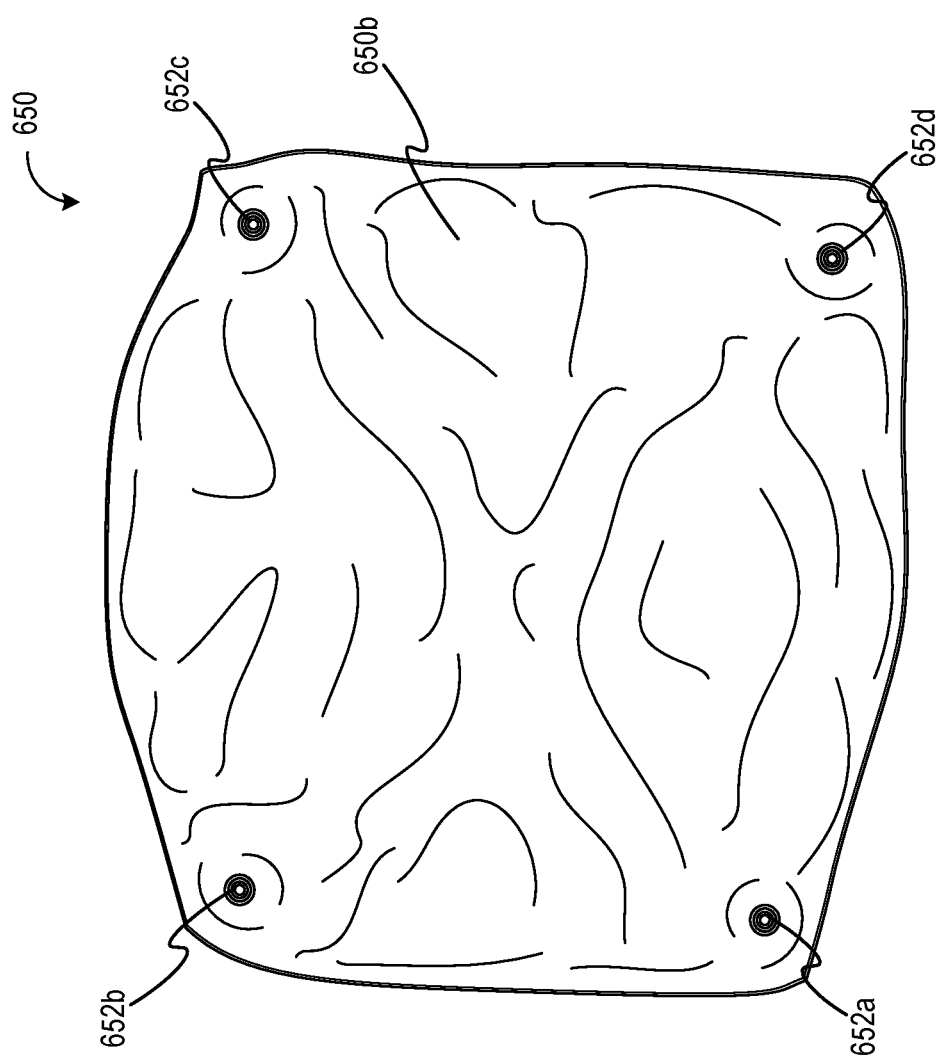

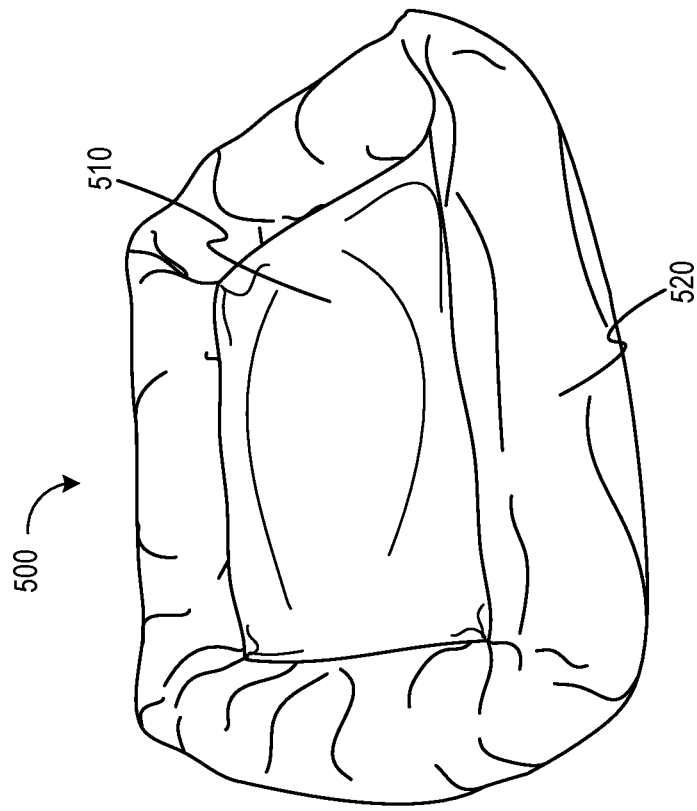
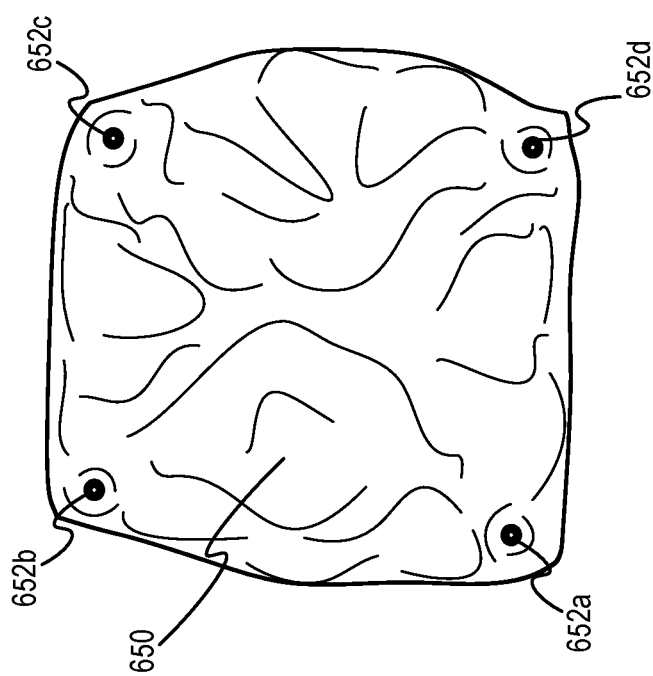
FIG. 7A

MODULAR PET BED

CROSS-REFERENCE TO RELATED APPLICATIONS

This application claims priority to U.S. provisional patent application with Ser. No. 62/854,872, which was filed May 30, 2019. This and all other extrinsic materials discussed herein are incorporated by reference in their entirety. Where a definition or use of a term in an incorporated reference is inconsistent or contrary to the definition of that term provided herein, the definition of that term provided herein applies and the definition of the term in the reference does not apply.

FIELD OF THE INVENTION

The field of the invention is modular pet beds.

BACKGROUND

Studies have shown that pet beds can be one of the top 10 dirtiest objects in the home, where germs and bacteria are concerned. Just as in a human bed, pet beds also contain contaminants like dirt, pollen, saliva, food particles, and dead skin cells, to name just a few. In addition, external parasites like fleas, ringworm, roundworms/hookworms, *salmonella/listeria*, MRSA, feces, vomit, and urine have also been found in pet beds.

Experts recommend washing your pet's bed at least once per week in hot water to kill these germs and parasites. However, many pet beds are not easily cleaned and eventually smell. Due to the size of pet beds and/or low quality materials, cleaning the pet beds can either be extremely difficult or impossible. Some pet beds have a removable cover to ease cleaning; however, washing the cover alone may not disinfect the bed itself.

Thus, there is a need for improved pet beds that can easily and effectively be cleaned.

SUMMARY

The present invention is directed to a modular pet bed comprising a first pet bed component, a second pet bed component, and a set of fastener assemblies operable to couple the first pet bed component to the second pet bed component.

In some embodiments, the first pet bed component comprises a central cushion component, and the second pet bed component can comprise an outer cushion component that is elongated and surrounds a portion or the entirety of a perimeter of the central cushion.

A third pet bed component may also be provided, along with a second set of fastener assemblies that removably couples the third pet bed component to at least one of the first and second pet bed components. The third pet bed component can comprise, for example, a pillow, a blanket, or a cove.

A cover may be provided that is washable separately from the cushioned components. The cover may be removably fastened to one or more of the pet bed components via a third set of fastener assemblies. In some preferred embodiments, the cover is sized and dimensioned to cover the entire top side of the fastened pet bed components, wrap around the sides of the fastened pet bed components, and fasten to a bottom side of the fastened pet bed components.

The fastener assemblies described herein may comprise a zipper assembly, a hook and loop fastener assembly, a snap fastener assembly, a button and button receiver fastener, or any other fastener assembly suitable for a modular pet bed that can be assembled, disassembled, and reassembled. It should be appreciated that a "set of fastener assemblies" can include a single fastener assembly or multiple fastener assemblies.

The pet bed assemblies described herein advantageously can be broken down into smaller components that can easily be washed and dried in most washer and dryer machines. The pet bed assemblies described herein also allow users to wash a dirty component without a need to wash the entire pet bed assembly, for example, where only one component is soiled. The pet bed assemblies described herein further provide a central cushion assembly that is removably securable to an outer cushion assembly such that the central cushion maintains a position relative to the outer cushion assembly even when a pet is biting, chewing or moving around within the pet bed assembly.

Other advantages and benefits of the disclosed system and methods will be apparent to one of ordinary skill with a review of the following description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which:

FIG. 2 illustrates an embodiment of an outer pet bed component;

FIG. 3 illustrates another embodiment of an outer pet bed component;

FIGS. 5A-5F illustrate an embodiment of a pet bed assembly at different stages of fastening first and second pet bed components to one another;

FIG. 6A illustrates an outer side of a cover for a pet bed assembly;

FIG. 6B illustrates an inner side of the cover of 6A;

FIG. 7A illustrates a top side of the fastened pet bed components of FIG. 5F and the cover of FIG. 6B;

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

The present disclosure is directed to modular pet beds that can be disassembled into multiple smaller parts that easily to fit in a washer and dryer. The individual parts then maintain their shape and can easily be fastened back together once they are clean and dry. The disclosed modular pet bed can also have an easily removable and washable cover that can be cleaned separate from the pet bed.

Figure 1:
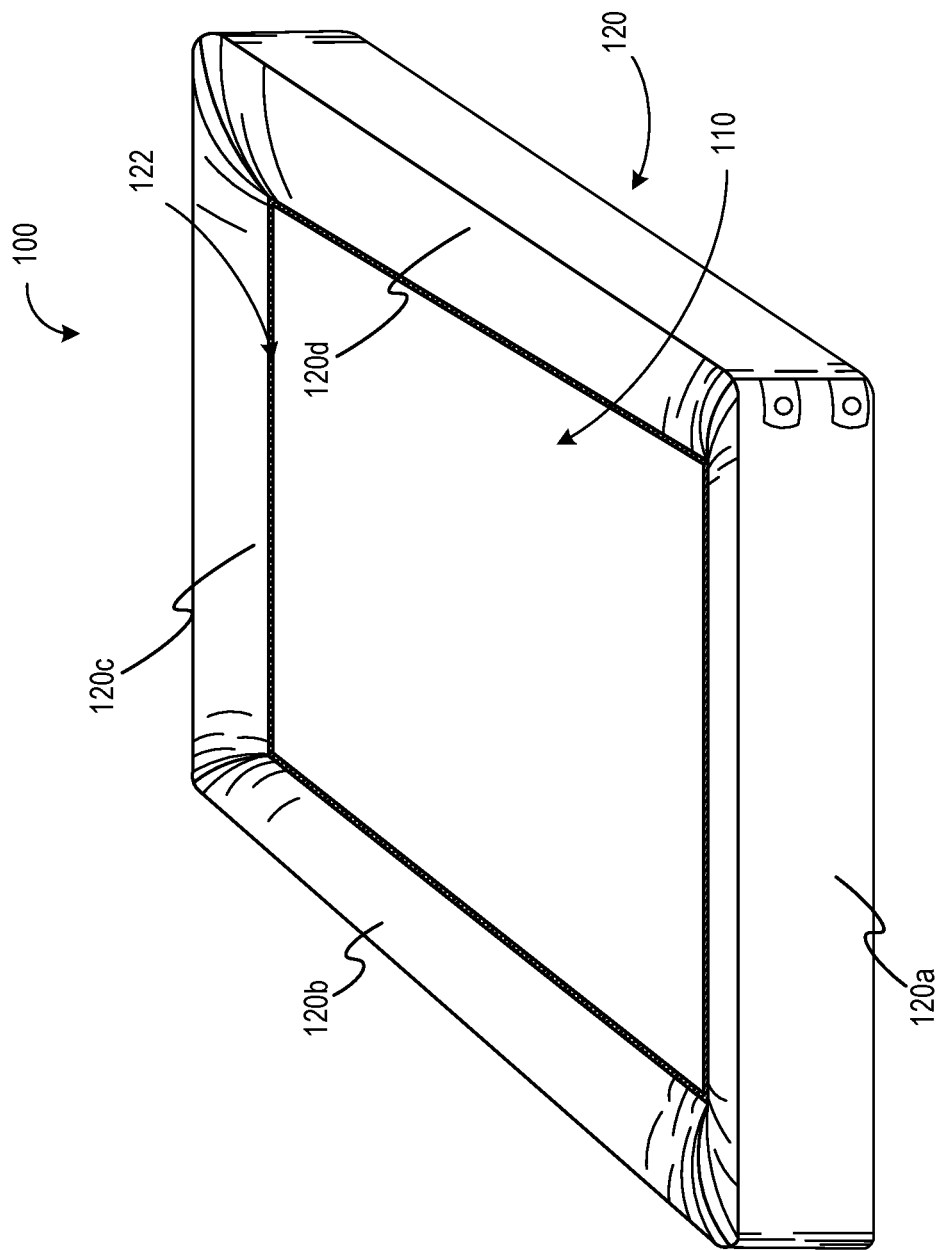
FIG. 1 illustrates an embodiment of a pet bed assembly of the present invention.

FIG. 1 illustrates a pet bed assembly 100. Pet bed assembly 100 includes a first pet bed component that is a central cushion component 110 and a second pet bed component that is an outer cushion component 120. Outer cushion component includes four outer cushion segments 120a, 120b, 120c, 120d. The segments can form a unitary component, or can comprise separate segments that are removably attached to one another via one or more fasteners. The central cushion component 110 can be coupled to outer cushion component 120 such that the outer cushion component 120 surrounds the central cushion component 110 in a manner where some or all of a top side and/or a bottom side of central cushion component 110 is exposed. In some preferred implementations, the outer cushion component 120 can be taller than the central cushion component 110. However, it is also contemplated that the outer cushion component can be the same height or shorter than the central cushion component. In some implementations, the central cushion component 110 can be coupled to the outer cushion component 120 via one or more zipper assemblies 122. Four outer cushion segments are shown, but that is not limiting to this disclosure. In general, there may be any suitable number of segments (e.g., 1, 2, 3, 4, 5, 6, 7, 8, or even more). For example, there may be as many outer cushion component segments as there are sides to the central cushion component 110. The outer cushion components may be elongated and bendable to align with a shape of a perimeter of a center cushion component, for example, forming a toroid or donut shape having a rounded, circular, oval, square and/or rectangular cross-section. Similarly, central cushion component 110 can comprise any suitable shape, as in for example, a cuboid shape, dome shape, a 3-dimensional polygonal shape, and/or a round cushion shape having a thicker central portion and thinner edge portions. The center cushion component can have, for example, a circular, rectangular, polygonal, or oval cross-sectional shape and/or top surface. It should be appreciated that pet bed assemblies of the inventive subject matter can be 3-dimensional in shape including outer surface material(s) and inner cushion or padding material(s).

FIG. 2 illustrates an embodiment of an outer cushion component 220 comprising a plurality of segments 220a, 220b, 220c and 220d, which form a unitary component. The segments can be permanently coupled in a serial manner (e.g., sewn together), such that two end segments (e.g., 220a, 220d) are permanently coupled to only one other segment. First non-end segment 220b can be coupled to (e.g., stitched to or unitary with) first end segment 220a on a first side and a second non-end segment 220c on a second side. Similarly, the second non-end segment 220c can be coupled to first non-end segment 220b on a first side, and another segment (e.g., second end segment 220d) on a second side. First end segment 220a can be coupled to second end segment 220d via a fastening assembly 228. For example, the fastening assembly 228 can include snaps 228a, 228b, 228c, 228d, as shown, or other fastening assemblies such as a zipper assembly or a hook-and-loop fastener assembly. Therefore, when first end segment 220a is coupled to second end segment 220d via the fastening assembly 228, the outer cushion component 220 forms a continuous loop. Outer cushion component 220 can be coupled to a central cushion component (e.g., 110) via a fastener component or fastener components 224 of outer cushion component and a complementary fastener component or fastener components on central cushion component before and/or after first end segment 220a is coupled to second end segment 220d via fastening assembly 228 (comprising snap components 228a, 228b, 228c, 228d). The fastening assembly or assemblies 228 can serve a structural purpose, providing support to the outer cushion component 220 or the outer cushion segments 220a, 220b, 220c, 220d holding them upright.

FIG. 3 illustrates another embodiment of an outer pet bed component 320 comprising a plurality of segments 320a, 320b, 320c and 320d. The outer cushion component shown in FIG. 3 can be similar to the outer cushion component 220 of FIG. 2. However, two or more of the non-end segments (e.g., 320b, 320c) are removably fastened to one another via segment fastener assembly or assemblies 329. First end segment 120a can be permanently coupled to the first non-end segment 320b, and second non-end segment 320c can be permanently coupled to second end segment 320d. Fastening assembly 329 can be used to fasten first non-end segment 320b to second non-end segment 320c, and fastening assembly 328 (comprising snap component 328a, 328b, 328c, 328d) can fasten first end segment 320a to second end segment 320d to form a continuous loop of outer pet bed component 320. Accordingly, a first zipper component 324a along a length of segments 320a and 320b, and a second zipper component 324b along a length of segments 320c and 320d can be implemented to couple the outer pet bed component 320 to a central pet bed component. The central pet bed component can have multiple zipper components that complement the first zipper component 324a and second zipper component 324b. For example, a central pet bed component can comprise a third zipper component that fastens with first zipper component 324a, and a fourth zipper component that fastens with second zipper component 324b. The configuration of FIG. 3 having an outer pet bed component 120 with non-end segments that removably fasten to one another can be advantageous for larger pet beds and pet bed assemblies.

Figure 4B:
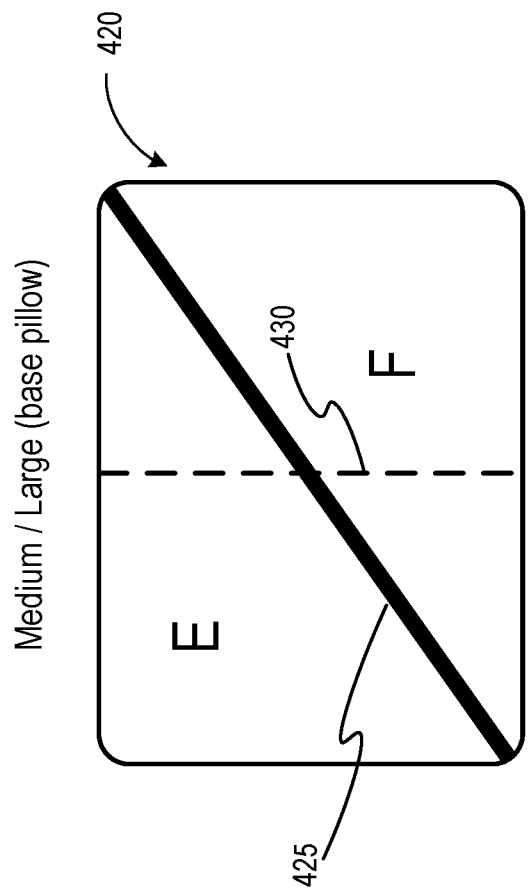
FIG. 4B illustrates another embodiment of a central pet bed component.
Figure 4A:
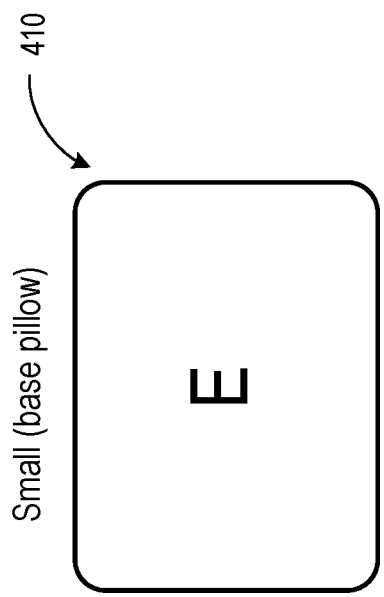
FIG. 4A illustrates an embodiment of a central pet bed component.

FIG. 4A illustrates an embodiment of a first pet bed component 410 that is a central cushion component E and a single unitary body. This can be advantageous for, among other things, smaller pet beds where the single unitary body first cushion component 410 can fit easily within a washer or dryer. First pet bed component 410 comprises a cushion material contained within an outer material. The cushion material can be permanently contained within the outer material such that it cannot be removed without damaging the outer material, or can be removably contained such that the cushion material can be removed, for example, by unzipping a zipper of the outer material.

FIG. 4B illustrates another embodiment of a first pet bed component that is a central cushion component 420 comprising two or more separable segments E, F, removably coupled to one another via a fastening assembly or assemblies. This can be advantageous for, among other things, larger pet beds where a large central cushion would be difficult or too large to wash and dry in traditional washers and dryers. Central cushion component 420 comprises two segments that are shown as rectangular segments and/or triangular segments. Where the segments are triangular, fastening assembly 425 (e.g., a zipper) can split the larger central cushion component 420 into smaller segments that fit into the washer and/or dryer. Additionally or alternatively, a connector 430 (shown in dashed lines) can be implemented to split the central cushion component 420 into two smaller rectangular (or square) segments. It should be noted that the number of smaller portions of the central cushion component 420 disclosed here is not limiting on the disclosure. The central cushion component can comprise any suitable number of segments and fastener components. The two or more smaller segments can be coupled with one or more fastening assemblies to form the central cushion component. The multi-segment central cushion component 420 and/or the single unitary body central cushion component 410 can be implemented, for example, with the outer cushion components described herein (e.g., 120, 220, 320) via one or more fastener components of the outer cushion component and one or more fastener components of the central cushion component.

FIGS. 5A-5F illustrate an embodiment of a pet bed assembly 500 at different stages of fastening first and second pet bed components to one another. Pet bed assembly 500 comprises a first pet bed component 510. First pet bed component 510 comprises a top side (shown in FIG. 5F), a bottom side (shown in FIGS. 5A-5E), a first fastener component 514a disposed at a first perimeter portion of the first pet bed component's perimeter, and a second fastener component 514b disposed at a second perimeter portion of the first pet bed component's perimeter. In some embodiments, each of the first and second fastener components can be disposed along, for example, 40-50% of the first pet bed component's perimeter. Second pet bed component 520 comprises a top side (shown in FIG. 5F), a bottom side (shown in FIGS. 5A-5E), a third fastener component 524a, a fourth fastener component 524b, a first end 521a comprising a fifth fastener component 528a, and a second end 521b comprising a sixth fastener component 528b. In some embodiments, each of the third and fourth fastener components can be disposed along, for example, 40-50% of the side length of the second pet bed component.

Figure 5A:
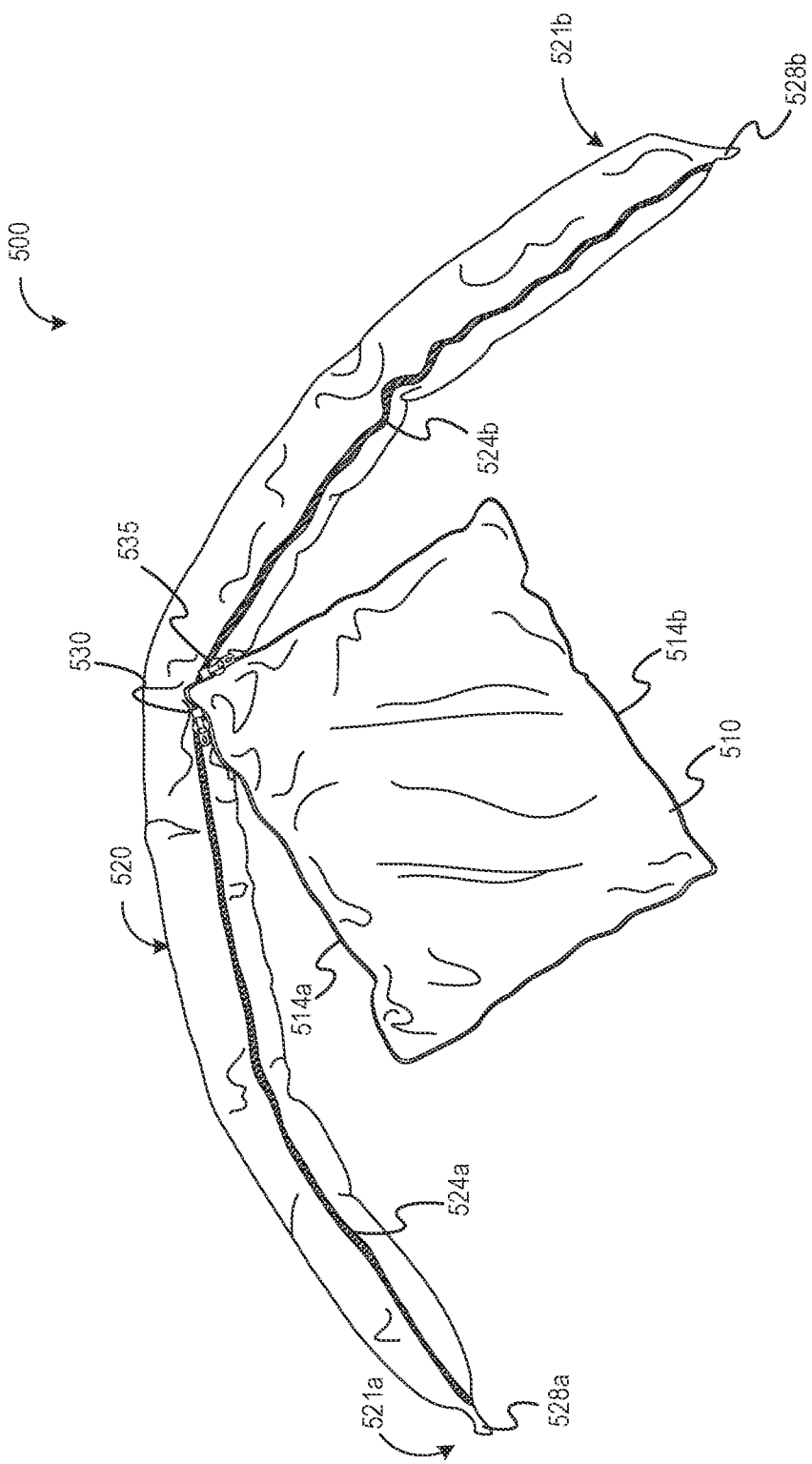
Figure 5B:
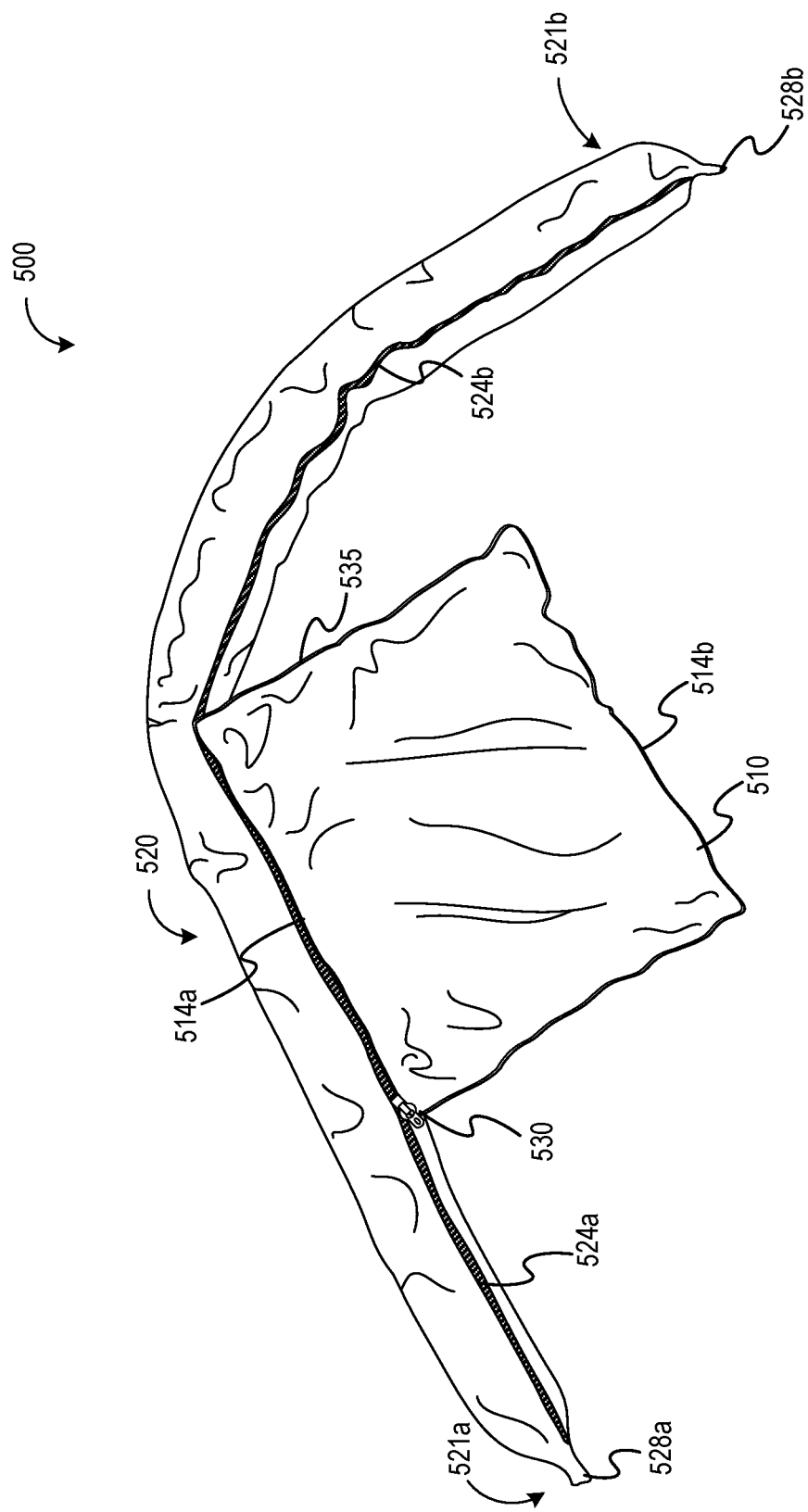
Figure 5C:
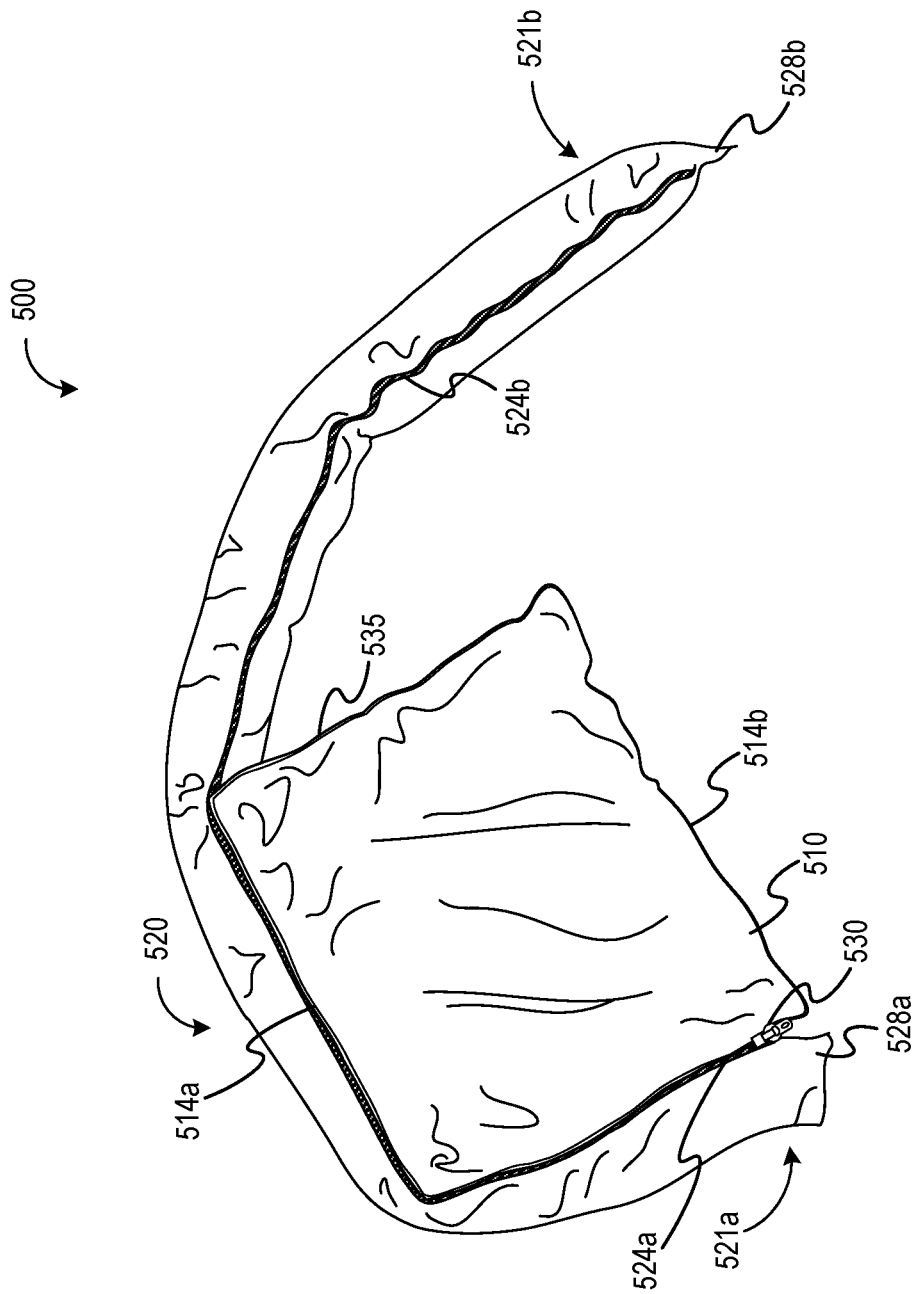
Figure 5E:
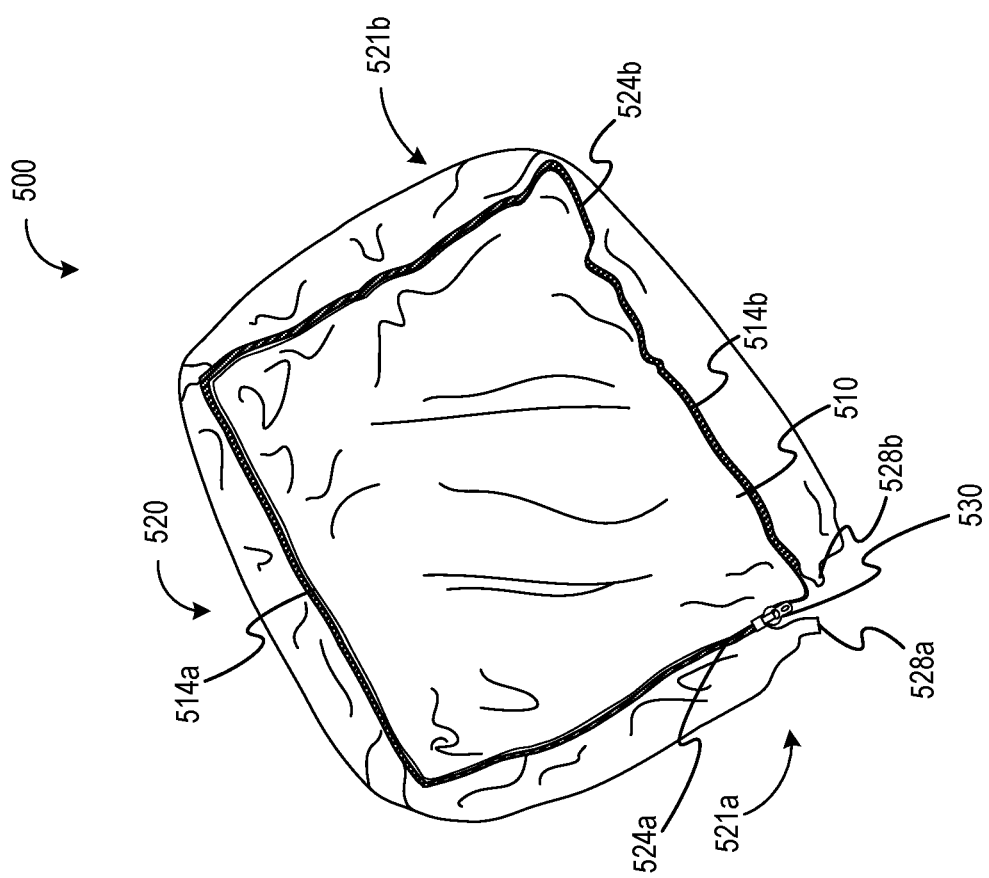
Figure 5F:

As illustrated in FIG. 5A, first pet bed component 510 fastens to second pet bed component 520 at connection points 530 and 535 via fastener components 514a and 524a, and via fastener components 514b and 524b. In FIGS. 5B-5C, first fastener component 514a and third fastener component 524a are fastened together. In FIGS. 5D-5E, second fastener component 514b and fourth fastener component 524b are fastened together. In FIG. 5F, fifth and sixth fastener components 528a and 528b are fastened together to secure first end 521a to second 521b to form a continuous loop.

Although FIGS. 5A-5F illustrate pet bed components that each comprise two zipper components, it is contemplated that a pet bed assembly could comprise a central cushion component with a single fastener component that extends around substantially all (at least 80%, at least 85%, at least 90%) of a perimeter, and an outer cushion component with a single fastener component that extends along substantially all of a side length (at least 80%, at least 85%, at least 90%). It is also contemplated that a pet bed assembly could comprise a central cushion component with three or more fastener components (e.g., 4, 5, 6, 7, 8, or even more) that in combination extend around substantially all (at least 80%, at least 85%, at least 90%) of a perimeter, and an outer cushion component with three or more fastener components (e.g., 4, 5, 6, 7, 8, or even more) that in combination extend along substantially all of a side length (at least 80%, at least 85%, at least 90%). In some embodiments, side length of a second pet bed component can be substantially the same as (within ±20%, within ±15%, within ±10% of) a length of an entire perimeter of a first pet bed component. In some embodiments, for example where the second pet bed component couples with a non-perimeter portion of a first pet bed component, the second pet bed component may have a side length that is shorter than (e.g., between 75-99% of, between 75-95% of, between 85-95% of) a length of an entire perimeter of a first pet bed component.

Each fastener component can be disposed along any suitable portion of any of the pet bed components, including perimeter portions, a top side, a bottom side, along a length, and/or any other portion of the pet bed component. In some contemplated embodiments, a first set of fastener components can be disposed along substantially all (at least 80%, at least 85%, at least 90%) of a perimeter of a central cushion component, and a second set of fastener components can be disposed along substantially all (at least 80%, at least 85%, at least 90%) of a side length of an elongated outer cushion component. Each set of fastener components can comprise any suitable number of fastener components, including a single fastener component, 2, 3, 4, 5, 6, 7, 8, 10, 15, 20 or even more fastener components.

FIG. 6A illustrates an outer side of a cover for a pet bed assembly FIG. 6B illustrates an inner side of the cover of 6A. Cover 650 comprises an opening 660, an outer surface 650a, and an inner surface 650b. Inner surface 650b comprises fastener components 652a, 652b, 652c and 652d, which are illustrated as snap components.

Figure 7B:
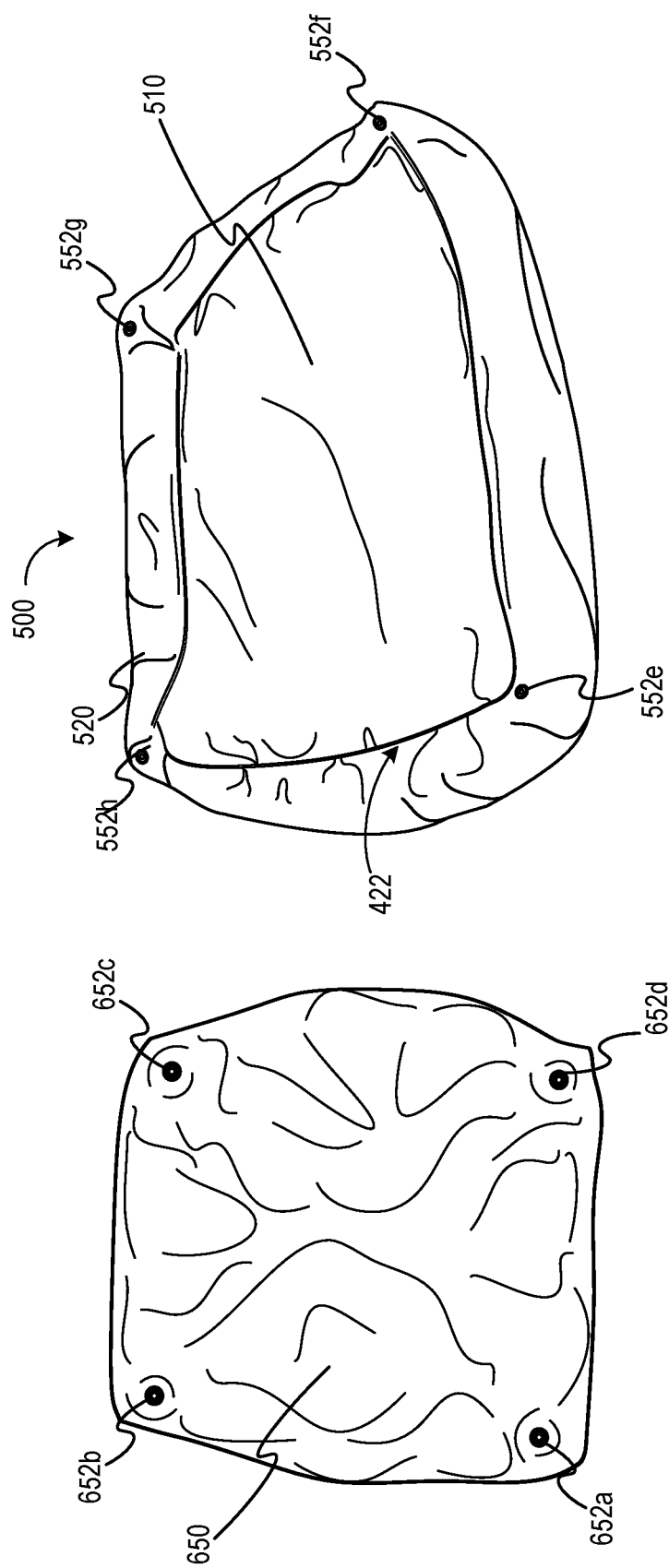
FIG. 7B illustrates a bottom side of the fastened pet bed components of FIG. 5F and the cover of FIG. 6B.
Figure 8:
FIG. 8 illustrates the fastened components of FIG. 5F covered by the cover of FIG. 6B.

FIG. 7A illustrates a top side of the fastened pet bed components 500 (including 510, 520) of FIG. 5F and the inner surface 650b of cover 650 of FIG. 6B. FIG. 7B illustrates a bottom side of the fastened pet bed components 500 of FIG. 5F and the inner surface 650b of cover 650 of FIG. 6B. The cover 650 can be formed similar to a fitted sheet on a standard bed that completely covers the top side of central cushion component 510 and the outer cushion component 520 of the pet bed assembly 500. The cover 650 can have an elastic band around the opening that is sized to receive the pet bed assembly 500. The elastic band can stretch over the outer perimeter of the pet bed assembly's outer cushion component 520 and serve to hold the cover 650 in place. The fastening assemblies can then secure the cover 650 to a bottom side of the central cushion component 510 (or any other suitable portion) of pet bed assembly 500. In other embodiments, the fastening assemblies can also couple the cover 650 to a bottom side of the outer cushion component 520. The cover 650 can have sufficient material such that the cover 650 can be placed over the top side of the pet bed assembly, fasten to a bottom side of the pet bed assembly, and have a portion that is tucked into the pet bed assembly 500 along the edge of the central cushion component 510 where it meets the outer cushion component 520, for example, as shown in FIG. 8 (referenced as 800).

The cover 650 can be coupled to the pet bed assembly 500 via one or more (e.g., a plurality) of fastening assemblies and components (e.g., fastening assembly comprising 652a and 552f, fastening assembly comprising 652d and 552e, fastening assembly comprising 652c and 552h, and fastening assembly comprising 662b and 552g). The fastening assemblies can comprise snaps, buttons, hook and loop fasteners, or other suitable components that can couple the cover 650 to the pet bed assembly 500. The cover 650 of FIGS. 7A-7B is shown inside-out, revealing one half of the fastening assemblies (labeled 652a, 652b, 652c, 652d). A second half of the fastening assemblies are formed to the bottom of the pet bed assembly (552e, 552f, 552g, 552h).

Figure 9:
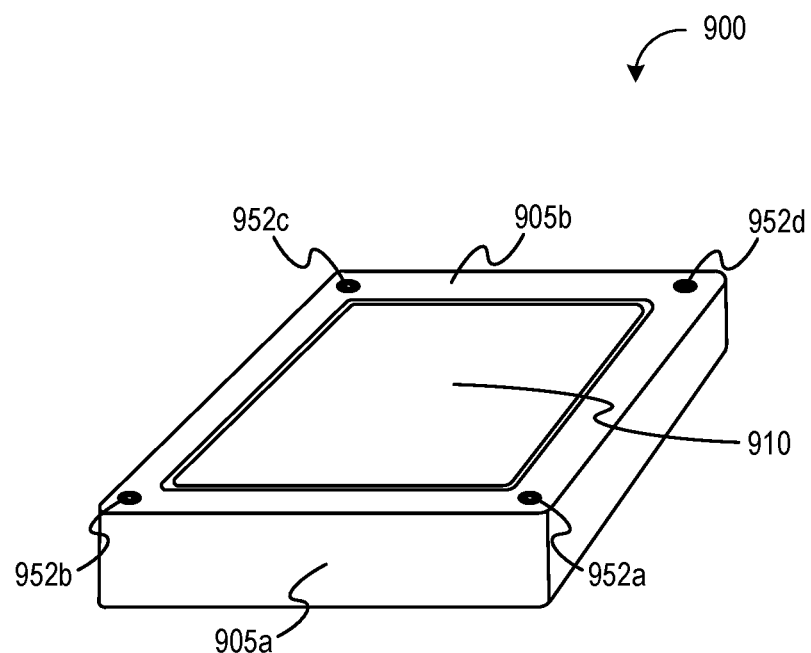
FIG. 9 illustrates an embodiment of a cover including a pocket for receiving at least one of a heating or cooling pad.

FIG. 9 illustrates an embodiment of a cover including a pocket for receiving at least one of a heating or cooling pad. Cover 900 includes a central portion 905b and side cover portion 905a. Cover 900 includes fastener components 952a, 952b, 952c and 952d, and a pocket 910 sized and dimensioned to receive a heating and/or cooling pad, preferably disposed on central portion 905b.

Figure 10:
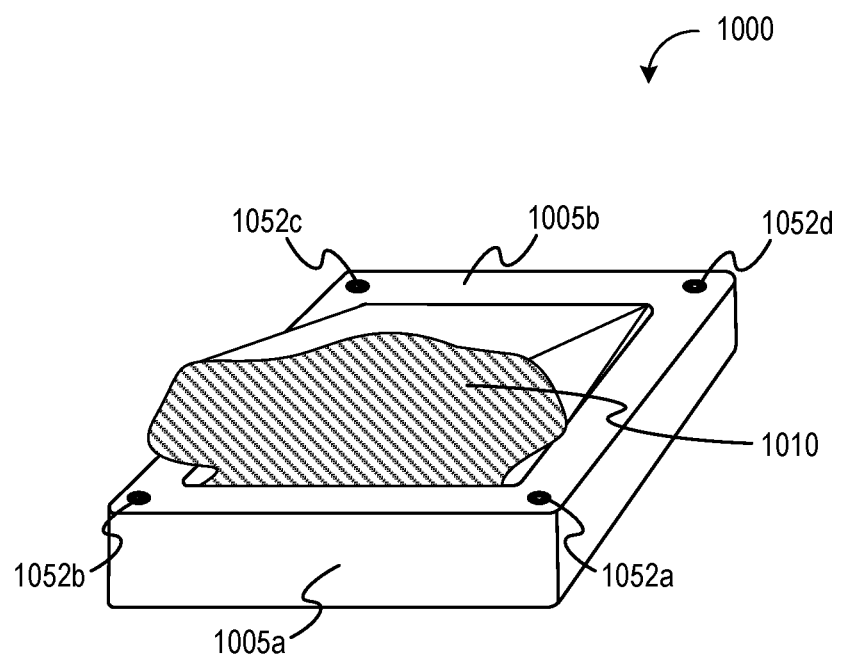
FIG. 10 illustrates an embodiment of a cover including a cove.

FIG. 10 illustrates an embodiment of a cover including a cove. Cover 1000 includes a central portion 1005b and side cover portion 1005a. Cover 1000 includes fastener components 1052a, 1052b, 1052c and 1052d, and an addition 1010, which may a blanket or material shaped as a cove similar in shape to a sleeping bag for a pet having a closed end and an open end, preferably disposed on central portion 1005b. In some contemplated embodiments, the addition 1010 can be removably coupled to cover 1000 via fastening assemblies such as one or more zippers, snaps, buttons, hook and loop fasteners, etc. In some embodiments, the addition 1010 may be a part of, and/or permanently affixed to, the cover.

Covers having pockets for receiving heating and/or cooling pads, as well as covers having built in or removably attachable blankets, coves and/or other additions are beneficial in allowing the pet bed assembly to provide comfort to pets in various temperature settings.

In some aspects, it is contemplated that pockets, pillows, cushion assemblies, blankets, coves and/or other additions can be removably fastened to the pet bed assemblies themselves (e.g., the central cushion component and/or outer cushion component) via a set of fastener assemblies.

The various components of the pet bed assemblies, including the central cushion component, the outer cushion (s) component, the blanket, the cover and so forth, can be formed from any suitable material or materials. In general, each component can be made from a sturdy material that can withstand repeated washer/dryer cycles to maintain cleanliness of the pet bed assembly. In some embodiments, various components of the pet bed assembly (e.g., outer material) can be made from cotton materials such as canvas. In some other embodiments, certain synthetics materials such as nylon (e.g., Cordura™) can also be implemented in the construction of the pet bed assembly. In some embodiments, silver fibers can be included for antimicrobial purposes. Other materials can be included in the construction of the pet bed assembly, such as various hydrophobic compounds or materials with antibacterial and antimicrobial characteristics. In some other embodiments, these characteristics may be inherent in the selected materials.

It should be appreciated that a pet bed component (e.g., a central cushion component, an outer cushion component) can comprise two or more sub-components that are removably coupled to one another to form the component. For example, where a pet bed component comprises a central cushion component, the central cushion component can comprise two or more segments that removably fasten to one another. Where a pet bed component comprises an outer cushion component, the outer cushion component can comprise two or more segments that removably fasten to one another. In some contemplated embodiments, a central cushion component comprises two segments that each include 3 corners (e.g., a triangle, a triangle with rounded corners) and are removably couplable to one another. The longest edge of each segment includes a zipper component, and the zipper components on the segments are complementary to one another. Thus, the two segments can fasten to one another to form a rectangular or other four cornered cushion component that includes a zipper fastener assembly, for example, extending diagonally across the cushion component. The outer cushion component that surrounds the central cushion component can comprise four segments, each of which is configured to removably couple with at least one other segment and a side edge of the central cushion component. For example, each outer cushion component segment could include one or more end portions including fasteners (e.g., snaps) for coupling to one or two other outer cushion component segments. Additionally, each outer cushion component segment can include a zipper component along a side edge that removably couples with a zipper component along a perimeter portion of the central cushion component (e.g., a perimeter portion between two corners of the central cushion component). When the two central cushion components and the four outer cushion components are fastened to one another, the pet bed assembly can comprise a generally rectangular central cushion component with a continuous loop outer cushion component extending along the four outer edges of the central cushion component.

Additionally or alternatively, the pet bed components can comprise segments that are non-removable/non-detachable segments.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

As used herein, and unless the context dictates otherwise, the term "coupled to" is intended to include both direct coupling (in which two elements that are coupled to each other contact each other) and indirect coupling (in which at least one additional element is located between the two elements).

The recitation of ranges of values herein is merely intended to serve as a shorthand method of referring individually to each separate value falling within the range, and including the endpoints. Unless otherwise indicated herein, each individual value is incorporated into the specification as if it were individually recited herein.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "assembly," "mechanism," "element," "device," and the like may not be a substitute for the word "means." As such, no claim element is to be construed as a means plus function unless the element is expressly recited using the phrase "means for."

The accompanying claims and their equivalents are intended to cover such forms or modifications as would fall within the scope of the disclosure. The features and attributes of the specific example embodiments of the modular pet bed disclosed above may be combined in different ways to form additional embodiments, all of which fall within the scope of the disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A modular pet bed comprising:
   a central cushion;
   an outer cushion adapted to surround a perimeter of the central component; and
   a set of fastener assemblies comprising a first set of fastener components attached to the central cushion and a second set of fastener components attached to the outer cushion, and wherein the set of fastener assemblies is operable to couple the central cushion to the outer cushion,
   wherein the first and second set of fastener assemblies comprise,
      a first zipper assembly having a first zipper component attached to at least a first side on the central cushion and a second zipper component disposed on the outer cushion; and
      a second zipper assembly having a third zipper component attached to at least a second side of the central cushion, opposite the first side of the central cushion, and a fourth zipper component disposed on the outer cushion,
      wherein the first zipper assembly and second zipper assembly are nonoverlapping.

2. The modular pet bed of claim 1, wherein the first zipper component and the third zipper component, in combination, are disposed along at least 80% of the perimeter of the central cushion.

3. The modular pet bed of claim 2, wherein the second zipper component and the fourth zipper component, in combination, are disposed along at least 80% of a first side edge of the outer cushion.

4. The modular pet bed of claim 1, wherein the outer cushion comprises a plurality of outer cushion segments.

5. The modular pet bed of claim 4, wherein at least 2 of the plurality of outer cushion segments are non-end segments that removably couple to one another.

6. The modular pet bed of claim 1, wherein the central cushion comprises a plurality of central cushion segments.

7. The modular pet bed of claim 1, wherein the central cushion comprises a padding material enclosed within an outer material.

8. The modular pet bed of claim 7, wherein the padding material is not removable from the outer material without damaging the outer material.

9. The modular pet bed of claim 7, wherein the outer material comprises a pocket sized and dimensioned to receive at least one of a heating and cooling pad.

10. The modular pet bed of claim 1, wherein the set of fastener assemblies comprises at least one of a hook and loop fastener, a snap fastener, and a button and button receiver fastener.

11. The modular pet bed of claim 1, wherein the outer cushion comprises a first end, a second end, a first side edge, and a second side edge, and wherein the outer cushion comprises an end-to-end fastener assembly operable to couple the first end to the second end.

12. The modular pet bed of claim 1, further comprising a pet bed component and a pet bed component fastener assembly, wherein the pet bed component removably couples with at least one of the central cushion and outer cushion via the third pet bed component fastener assembly.

13. The modular pet bed of claim 12, wherein the pet bed component comprises at least one of a pillow, a blanket, and a cove.

14. The modular pet bed of claim 1, further comprising a cover operable to cover an upper surface of each of the central cushion and outer cushion, the cover having a third set of fastener components operable to secure the cover to a bottom surface of at least one of the first and second pet bed components.

15. The modular pet bed of claim 14, wherein the cover comprises a pocket sized and dimensioned to receiving at least one of a heating and cooling pad.

16. The modular pet bed of claim 14, wherein the cover is removably coupled to a blanket.

17. The modular pet bed of claim 14, wherein the cover is removably coupled to a cove component.

18. The modular pet bed of claim 4, wherein each of the plurality of outer cushion segments comprises a common first shape,
   wherein the central cushion comprises a plurality of identical central cushion segments, each identical central cushion segment comprises a common second shape, wherein the first shape is different from the second shapes,
   wherein the plurality of central cushion segments are coupled to each other and adjacent to each other in a lateral direction.

* * * * *